United States Patent [19]

Baxter et al.

[11] Patent Number: 4,614,426
[45] Date of Patent: Sep. 30, 1986

[54] PASSIVE TARGET DETECTOR

[75] Inventors: Ivor R. Baxter, Brentwood; Thomas Hair, Chelmsford, both of England

[73] Assignee: The Marconi Company Limited, Stanmore, England

[21] Appl. No.: 549,554

[22] Filed: Nov. 7, 1983

[30] Foreign Application Priority Data

Nov. 9, 1982 [GB] United Kingdom ............... 8231533

[51] Int. Cl.⁴ .......................... G01C 3/00; G01C 3/08
[52] U.S. Cl. ............................................ 356/1; 356/4
[58] Field of Search .............. 356/1, 4, 152; 343/455; 364/458, 461

[56] References Cited

U.S. PATENT DOCUMENTS

| | | | |
|---|---|---|---|
| 2,878,711 | 3/1959 | Blackstone | 88/1 |
| 3,320,615 | 5/1967 | Albright et al. | 343/112 |
| 3,378,842 | 4/1968 | Phillips | 343/112 |
| 3,594,556 | 7/1971 | Edwards | 235/150.27 |
| 3,644,043 | 2/1972 | Jones et al. | 356/5 |
| 3,953,667 | 4/1976 | Layton et al. | 358/113 |
| 3,982,246 | 9/1976 | Lubar | 364/458 |
| 4,094,225 | 6/1978 | Greenwood | 250/342 |
| 4,174,177 | 11/1979 | Gardner et al. | 356/5 |
| 4,355,984 | 10/1982 | Maeda | 356/4 |
| 4,497,065 | 1/1985 | Tisdale et al. | 356/4 |

FOREIGN PATENT DOCUMENTS

| | | |
|---|---|---|
| 3023290 | 3/1982 | Fed. Rep. of Germany . |
| 1125306 | 8/1968 | United Kingdom . |
| 1196689 | 7/1970 | United Kingdom . |
| 1273161 | 5/1972 | United Kingdom . |
| 1305841 | 2/1973 | United Kingdom . |
| 1478835 | 7/1977 | United Kingdom . |
| 2041689 | 9/1980 | United Kingdom . |
| 2060309 | 4/1981 | United Kingdom . |
| 1599459 | 10/1981 | United Kingdom . |

Primary Examiner—S. C. Buczinski
Assistant Examiner—Linda J. Wallace
Attorney, Agent, or Firm—Spencer & Frank

[57] ABSTRACT

Passive target detectors which employ infra-red sensors may have difficulty in distinguishing between a cool target near the detector and a warmer one further away.

A detector detects a source of infra-red radiation and if its size indicates that it may be of interest, a point source detector operates a gate to allow information regarding the direction of the target to be transmitted to a store and to a calculator.

This information is combined in the calculator with stored directional information from the previous scan to give the range of the source. The real intensity of the source is then calculated from its range and apparent intensity. If the real intensity indicates that the target is of interest, an alarm or other indication may be operated.

8 Claims, 3 Drawing Figures

PASSIVE TARGET DETECTOR

BACKGROUND OF THE INVENTION

This invention relates to a passive target detector and more particularly to one adapted to be carried on a vehicle.

Passive target detectors which employ, for example, infra-red sensors may have difficulty in distinguishing between a cool object (e.g. a bird) at close range and a warmer object (e.g. a tank) at a great range. Similar difficulty arises in distinguishing between large objects at greater range and small objects at close ranges.

SUMMARY OF THE INVENTION

The object of the invention is to provide a detector system which overcomes the the above mentioned problem.

The invention provides a passive target detector adapted to be carried on a vehicle comprising means for inspecting a field of view when the vehicle is at different positions and for establishing, for each inspection, the direction, relative to the vehicle, of a target having an apparent dimension and/or intensity indicating that it is of potential interest, and means for comparing the directions established during two inspections to give an indication of the range of the target and for using the said indication of range to establish whether the real dimension and/or intensity is indicative of a target of interest.

The invention is also applicable to the determination of range per se and accordingly also provides a passive target detector adapted to be carried on a vehicle comprising means for scanning a field of view when the vehicle is at different positions and for establishing, for different frames of the scan, the direction, relative to the vehicle, of a target, and means for comparing the direction established during the different frames to give an indication of the range target.

Although typically infra-red energy emitted by a target is detected, other wavelengths of radiation may be sensed.

BRIEF DESCRIPTION OF THE DRAWINGS

Some ways in which the invention may be performed are now described by way of example with reference to the accompanying drawings in which.

DETAILED DESCRIPTION OF THE PREFERRED EMBODIMENTS

Figure 1:
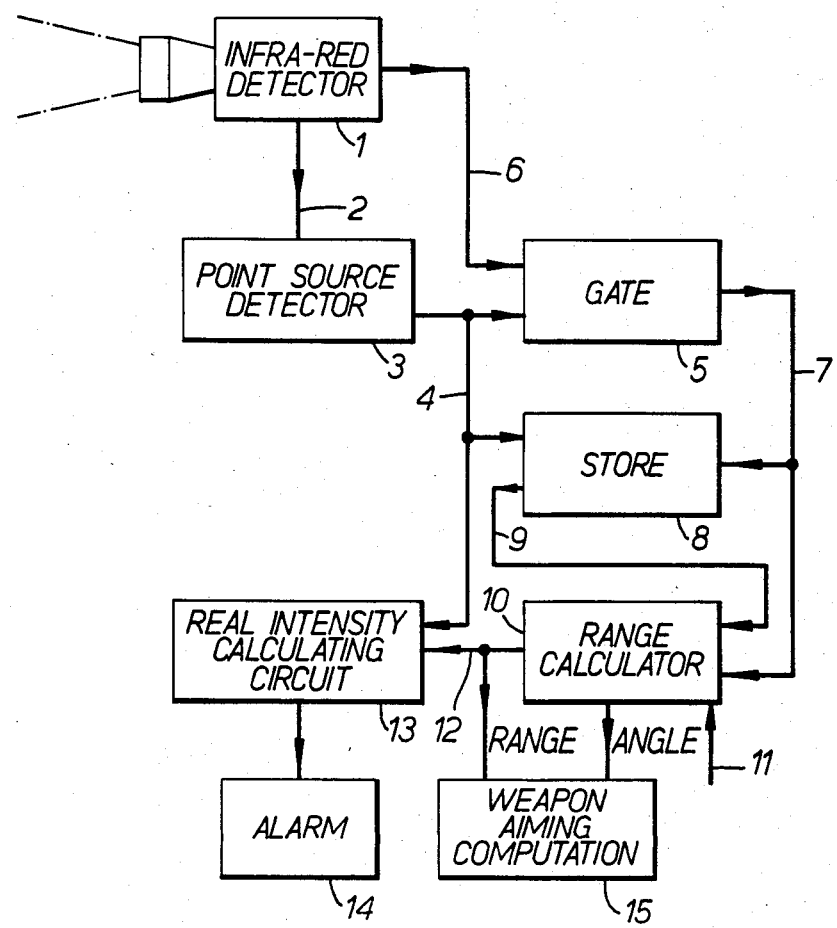
FIG. 1 is a block diagram illustrating a target detector forming part of a missile guidance or surveillance system constructed in accordance with the invention and installed in an aircraft.

With reference to FIG. 1, an infra-red detector 1 is able to cover a field of view by scanning methods or is a matrix detector having electronic scanning. The detector could, for example, be a FLIR having a linear array of detector elements; suitable detectors are available from manufacturers such as Marconi Avionics. The detector 1 scans through a field of view every t seconds and produces an output signal. This signal is transmitted along a line 2 to a spatial/amplitude filter 3, which is for example, a 'Point Source detector' as described in U.K. Patent Specification No. 1599459. The filter 3 identifies from the signal sources of less than a given apparent size, i.e. whose image on a face plate of the detector 1 is less than the given size, and which emit an intensity of radiation which, when received by the detector 1, is greater than a given value, this being a dynamic threshold so that the intensity of radiation from sources is compared to that of their surroundings. If the apparent size and intensity of the detected source indicates a potential target, the filter 3 sends a pulse, the amplitude of which represents intensity, along a line 4. This pulse, operates a gate 5 allowing the current angular scanning co-ordinates of the detector 1, which represent the azimuth and elevation of the source relative to the optical axis of the detector 1, to be applied to a line 7.

A store 8 contains the angular co-ordinates of the same source from the previous scan, which was made at a time t seconds earlier. A pulse on line 4, in addition to operating the gate 5, serves to read the co-ordinates from the last scan from the store 8 on to a line 9 and to write the co-ordinates from the current scan from line 7 into the store 8.

Figure 2:
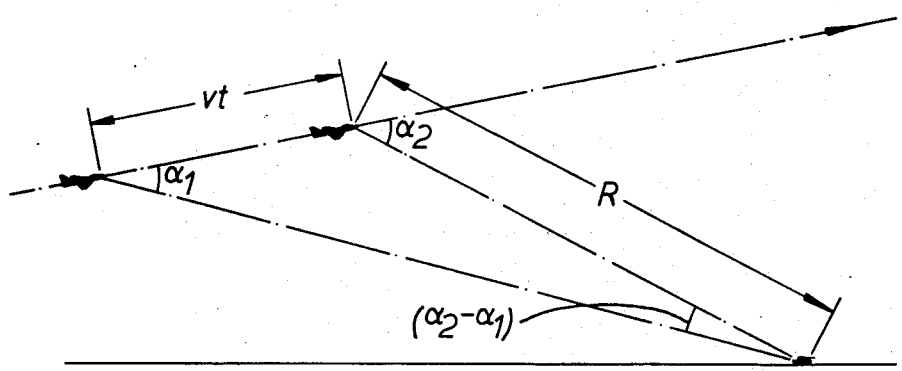
FIG. 2 is an explanatory diagram showing the path of an aircraft carrying the target detector of FIG. 1.

A range calculator 10 receives from lines 7 and 9 co-ordinates of the source from two successive scans and from these co-ordinates calculates the angles $\alpha_1$ and $\alpha_2$ as shown in FIG. 2. The calculator 10 also receives from line 11 a signal representing the velocity v of the aircraft relative to the ground. This allows the calculator 10 to calculate the range R of the target using the angles $\alpha_1$ and $\alpha_2$, the velocity v and the time (which is a constant). As will be seen from FIG. 2, the range R is given by the equation:

$$R = \frac{vt \sin\alpha_1}{\sin(\alpha_2 - \alpha_1)}$$

which, for small angles (i.e. when the angle of view of the infra-red detector 1 is very small) may be simplified to:

$$R = \frac{vt\alpha_1}{(\alpha_2 - \alpha_1)}$$

The result of this operation, i.e. the range of the source, is applied on line 12 to a circuit 13 which also receives the pulse on line 4, the amplitude of which represents the apparent intensity of the source. From this apparent intensity value and from the range the circuit 13 calculates the real intensity of the source.

The irradiation of the entrance pupil of the detector 1 which determines the amplitude of response is given by:

$$H = (Ta/R^2)I$$

where

H is the irradiance in $Wcm^{-2}$,

Ta is the atmospheric transmission and is equal to $e^{-\sigma R}$, where $\sigma$ is the extinction coefficient, and which depends on the prevailing weather conditions, R is the range of the source from the detector 1 in cm and I is the radiant intensity in $W\ sr^{-1}$ of the source.

From this it can be seen that if R is measured and an appropriate estimate of $\sigma$ made, the value of I, the real intensity, can be determined. If the real intensity is above a set threshold value the circuit 13 operates an alarm or other indicator 14 to inform an operator that an infra-red source constituting a potential target is within view, or to initiate automatically a weapon firing operation.

The range of a source on line 12 and the angle of it, and the rate of change of angle, relative to the aircraft's flight vector are used to aid weapon aiming computation in the block schematically at 15.

Figure 3:
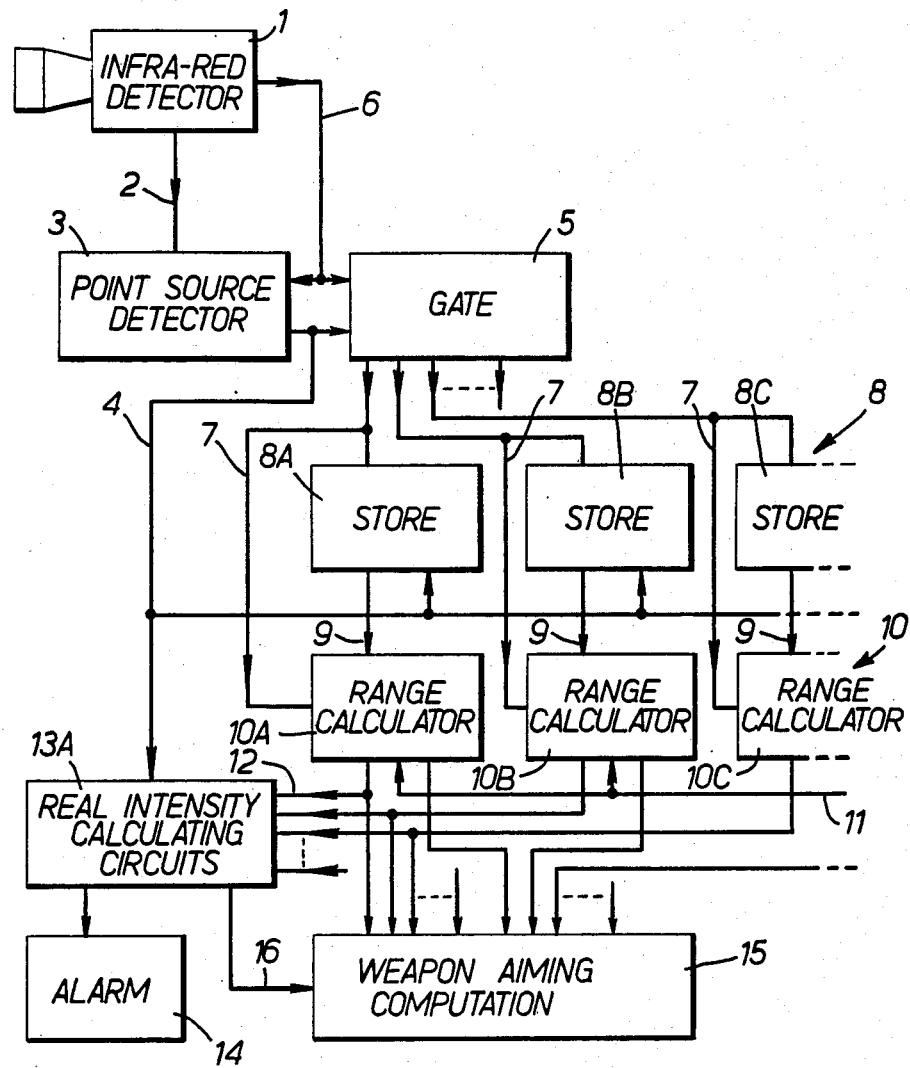
FIG. 3 is a block diagram illustrating further apparatus in accordance with the invention, the same references being used for similar parts throughout.

The above description concerns operation of the apparatus where one course is present. It is also possible to deal with a number of courses, as is now explained with reference to FIG. 3. In this case the field of view is scanned by the detector 1 sequentially and the responses of a number of potential point sources within this field appear serially from the detector 1. The store 8 is constructed to have a number of channels 8A, 8B, 8C, (only some of which are shown) and the co-ordinates of this number of suitably selected point sources may be stored during one scan. During the succeeding scan tracking techniques are used to enable new responses to be associated spatially with those in the store.

Since the movement of the detector is known, for example it may be mounted on an aircraft, and that of potential targets may be estimated, a source detected on one scan can be expected to generate a detector response within a certain region of the faceplate on the next succeeding scan. If then a response occurs within this region, it can be taken to be related to the same source. This spatial association is carried out at the filter 3 which controls the gate 5 to permit the angular co-ordinates to be fed into the correct channel.

The calculation process is then applied to produce range information on all these sources. Each channel 8A, 8B, 8C, is associated with a respective range calculator 10A, 10B, 10C, which performs the same operation as the calculator 10 of FIG. 1. The real intensities are calculated at 13A and priority allocated to the detected sources depending upon their real intensity, this priority data being transmitted to the weapon aiming computation 15 via line 16.

Other embodiments of the invention are designed only for the purpose of weapon aiming computation and for such purposes the components 13 and 14 can be omitted.

We claim:

1. A passive target detector adapted to be carried on a vehicle comprising: means for inspecting a field of view when the vehicle is at different positions and for establishing, for each inspection, the direction, relative to the vehicle, of a target having an apparent dimension and/or intensity indicating that it is of potential interest; and means for comparing the direction established during two inspections to give an indication of the range of the target and for using the said indication of range to establish whether the real dimension and/or intensity is indicative of a target of interest.

2. A passive target detector as claimed in claim 1 and including means for establishing, for each inspection, the direction, relative to the vehicle, of a plurality of targets having apparent dimensions and/or intensities indicating that they are of potential interest.

3. A passive target detector as claimed in claim 2 and including means for a locating priority to one of a number of targets.

4. A passive target detector as defined in claim 1 wherein said means for inspecting includes an infrared detector.

5. A passive target detector adapted to be carried by a vehicle comprising: first means for scanning a field of view when the vehicle is at different positions and for establishing, for different frames of the scan, the direction relative to the vehicle of a source having an apparent dimension and/or intensity indicating that it is a target of potential interest; second means, for calculating the range of the source from the directions of the source established during different frames; and third means for calculating the real intensity of the source from the apparent intensity and the calculated range of the source, and for providing an output signal when the calculated real intensity of the source is above a preset threshold value, indicating a target of interest.

6. A passive target detector as defined in claim 5 wherein said first means includes detector means for providing first and second output signals corresponding respectively to the detected energy and the direction of said detected energy relative to the vehicle, filter means responsive to said first output signal for providing an output signal corresponding to the apparent intensity of the detected energy when the apparent size and intensity of the detected energy indicates a potential target, gate means for passing said second output signal in response to said output signal from said filter means, and a storage means, having its input connected to the output of said gate means, for storing said second output signal.

7. A passive target detector as defined in claim 6 wherein: said second means has one input connected to said output of said gate means and a second input connected to the output of said storage means; said storage means is responsive to said output signal from said filter means to read out the stored said second output signal from the preceding said frame; and said third means has one input connected to the output of said second means and a second input connected to said output of said filter means.

8. A passive target detector as defined in claim 6 wherein said detector means is responsive to infrared energy.

* * * * *